July 5, 1960 D. S. SPECHLER 2,943,936
CARTOGRAPHIC MATERIAL
Filed Dec. 13, 1956 3 Sheets-Sheet 1
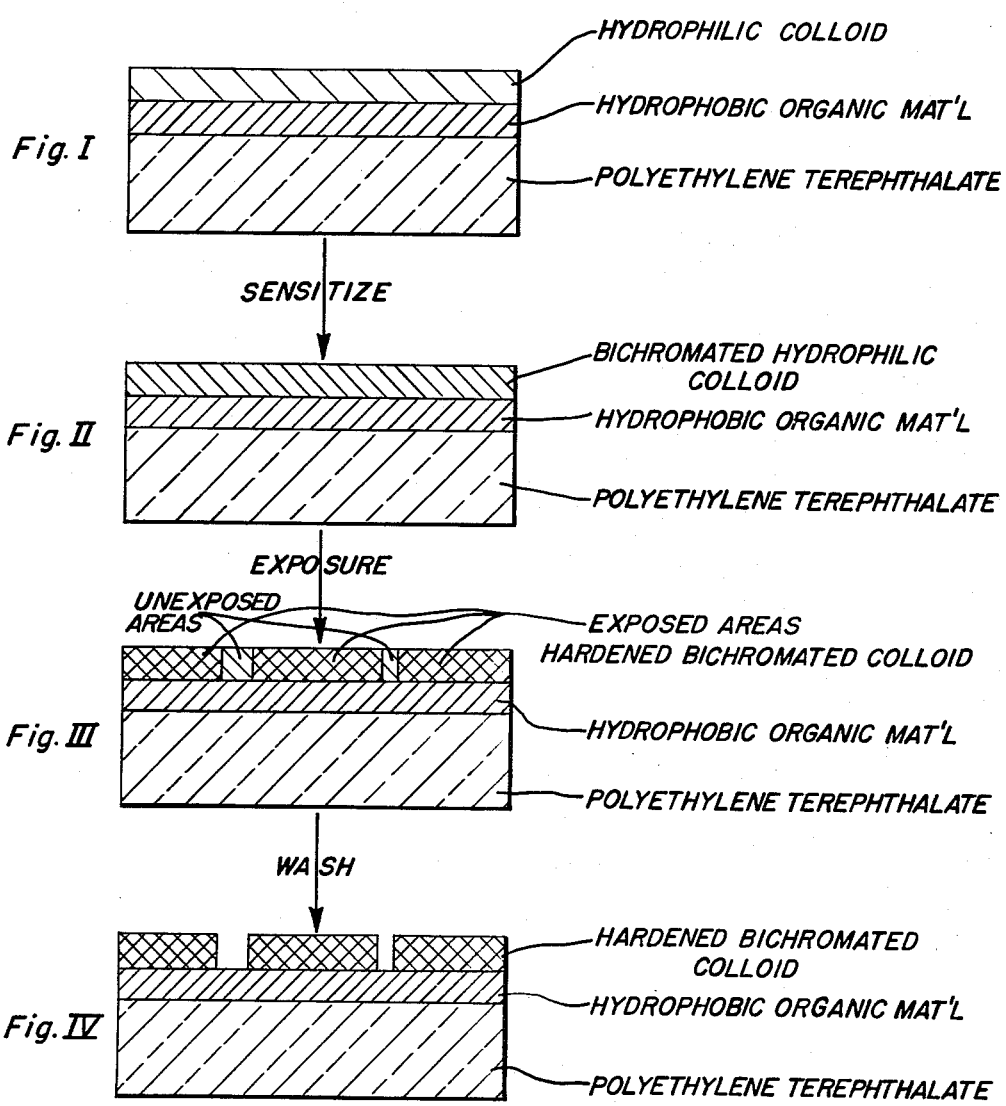
INVENTOR.
DANIEL S. SPECHLER
BY
ATTORNEY July 5, 1960
D. S. SPECHLER
2,943,936
CARTOGRAPHIC MATERIAL
Filed Dec. 13, 1956
3 Sheets-Sheet 2
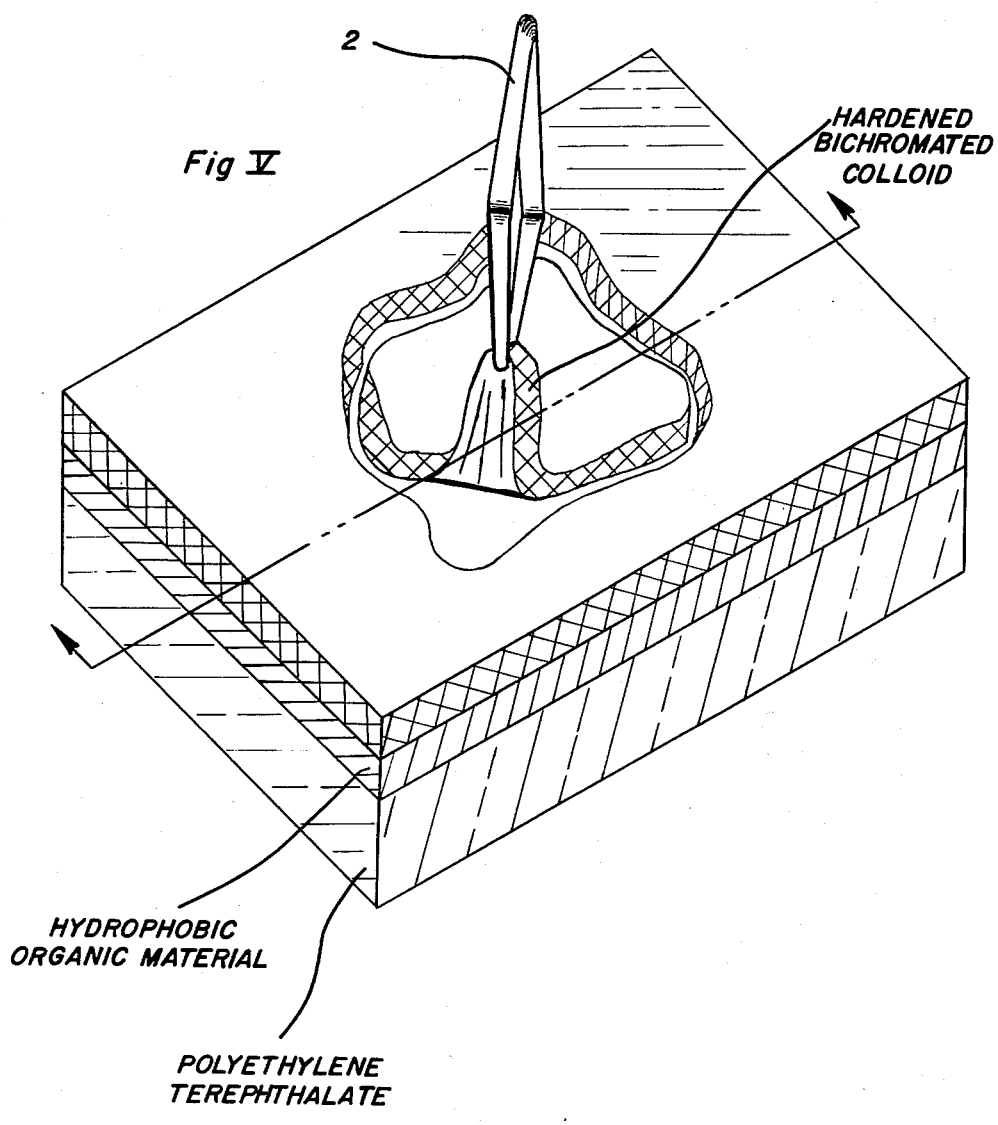
Fig V
HARDENED BICHROMATED COLLOID
HYDROPHOBIC ORGANIC MATERIAL
POLYETHYLENE TEREPHTHALATE
*INVENTOR.*
DANIEL S. SPECHLER
BY
*J. Russell Juten*
ATTORNEY

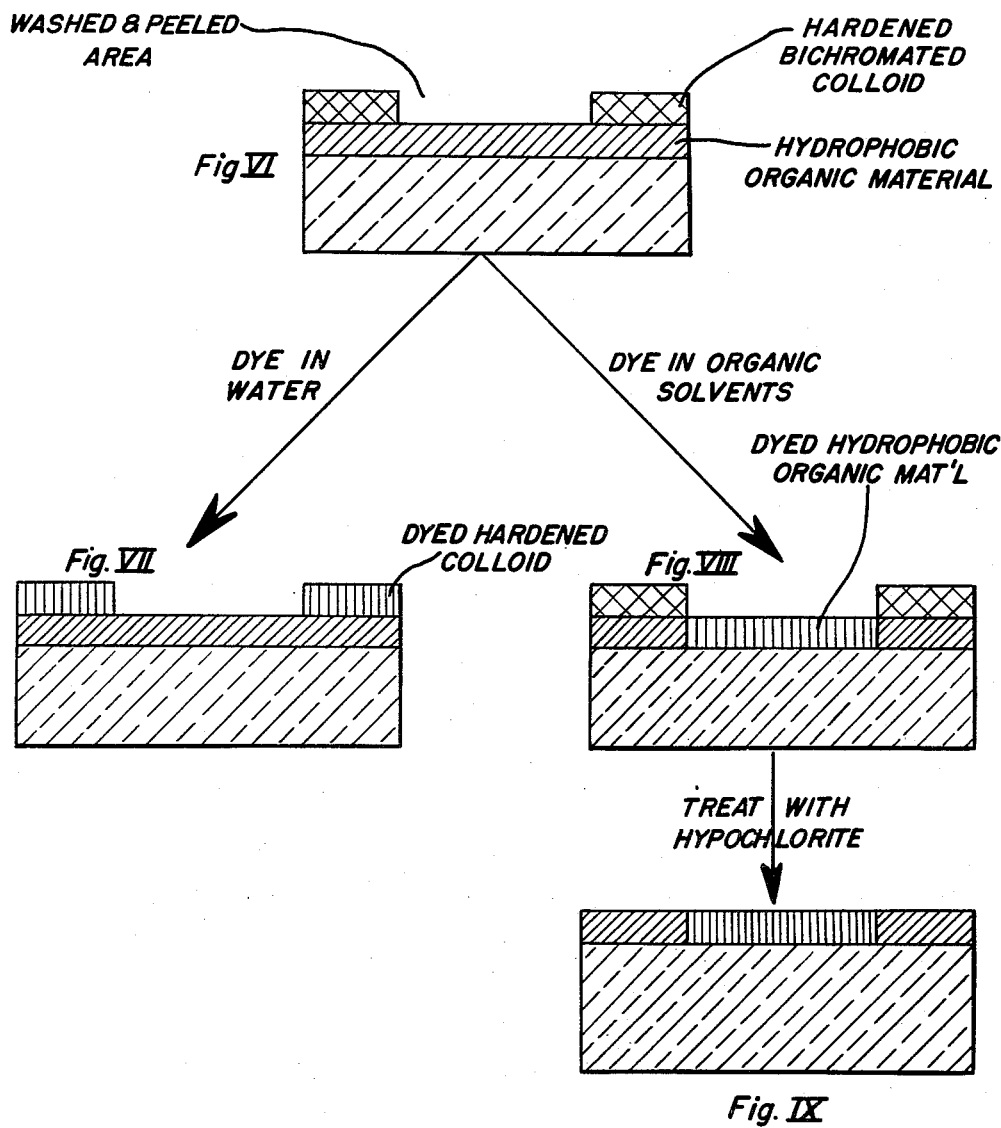

United States Patent Office 2,943,936
Patented July 5, 1960

2,943,936
CARTOGRAPHIC MATERIAL

Daniel S. Spechler, Brooklyn, N.Y., assignor to Keuffel & Esser Company, Hoboken, N.J., a corporation of New Jersey Filed Dec. 13, 1956, Ser. No. 627,981

3 Claims. (Cl. 96—75)

This invention relates to materials used in cartography, which are provided with a strippable coating that may be made photosensitive and by means of which a negative or positive image can be formed from an original by exposing, developing to wash out unexposed areas and stripping the film and then dyeing either the remaining portions of the strippable coating or the exposed portions of the material.

Prior art materials of this general type have employed a vinyl sheet as the base material. The principal object of the present invention is to provide an orientated polyethylene terephthalate film with suitable coatings so that it may be used for this type of cartographic material. Polyethylene terephthalate films have greater dimensional stability than the vinyl films. This is an important advantage in cartography where prints in various colors are often made which must be capable of lining up with each other accurately. The coatings used on vinyl film are, however, not suitable for use on polyethylene terephthalate because it is not possible to dye the polyethylene terephthalate film under ordinary room temperature conditions with a solution containing a dye dissolved in organic solvents.

Another disadvantage of the strippable coatings used in prior art materials and applied directly to the base film is that after formation of the image they tend to lift off the base film in the region immediately adjacent to the washed-out lines. When dyeing the base film to form a final image this permits the dye to undercut the strippable coating which results in widened out lines.

Now it has been found, however, that the polyethylene terephthalate film may be coated with an adherent film of organic material which is receptive to a solution of a dye dissolved in organic solvents. A strippable coating which is not receptive to the solution of a dye dissolved in organic solvents but which is receptive to a solution of a dye dissolved in water is then applied over the adherent coating. The fact that the base film of orientated polyethylene terephthalate is not receptive to the dye dissolved in organic solvents results in another important advantage over the prior art materials wherein the base film is a vinyl film. When these vinyl films were used, it was necessary to prevent the dye dissolved in organic solvents from reaching the backside of the film since if the dye solution came in contact with the backside of the vinyl sheet this side of the sheet would be dyed completely thereby masking the image formed on the front side of the sheet. According to the present invention the image formed by dyeing with a dye dissolved in organic solvents is limited to an adherent organic coating applied on one side of a polyethylene terephthalate film.

A variety of adherent coatings of hydrophobic organic materials may be applied to the polyethylene terephthalate film, including resinous materials such as nitrocellulose, ethylcellulose, acrylic resins, etc. It is preferred to use a coating including nitrocellulose. A coating including nitrocellulose and alkyd resins may be used to good advantage. Coatings including urea formaldehyde or melamine formaldehyde resins may also be used. This coating may also include a pigment such as silica if it is desired that the coating be receptive to pencil lines. Silica is preferred as a pigment for this purpose because it is transparent and will transmit light when the image formed on the material is used for making subsequent prints. However, calcium carbonate, magnesium silicate and others may also be used as a pigment. The following are examples of suitable adherent coatings to be applied to the polyethylene terephthalate base materials:

*Example I*

10 lbs. pigment ($SiO_2$)
3 lbs. dioctyl phthalate
7 lbs. nitrocellulose solids
40 lbs. solvents

*Example II*

10 lbs. $SiO_2$
3 lbs. urea formaldehyde resin
7 lbs. non-drying alkyd resin
35 lbs. solvents The solvents may be selected from suitable esters, ketones and the like such as ethyl acetate, butyl acetate and methyl ethyl ketone. The proportion of solids to solvents may be varied depending upon the manner of application of the coating. The above formula is intended for meniscus coating but the coating may also be applied by spraying, etc.

A hydrophilic vinyl coating is preferred for the strippable hydrophilic colloid coating which is applied over the adherent coating described above. One suitable coating for the purpose is disclosed in the following example:

*Example III*

|   | Grams |
|---|---|
| Poly-vinyl alcohol | 600 |
| De-ionized water | 5500 |
| Denatured alcohol | 2500 |

Other flexible materials capable of being sensitized including gelatin and similar colloids may be used for forming the strippable coating. Following is an example of a gelatine coating which may be used:

*Example IV*

|   | Grams |
|---|---|
| Gelatine | 600 |
| Water | 5500 |
| Denatured alcohol | 2500 |

These coatings may be tinted by adding a small proportion of a dye which is a visual aid in developing the image by swabbing with water before stripping the coating.

The invention will be more fully understood after reading the following description taken in connection with the accompanying drawings in which:

Fig. I is a view in diagrammatic sectional elevation showing the new cartographic material.

Fig. II is a view in diagrammatic sectional elevation showing the new cartographic material after it has been sensitized with a bichromate sensitizing solution.

Fig. III is a view in diagrammatic sectional elevation showing the sensitized material after exposure.

Fig. IV is a view in diagrammatic sectional elevation showing the exposed material after washing.

Fig. V is a view in perspective showing the peeling of selected areas of the hardened bichromate colloid strippable coating. The section line and arrows on this view indicate the plane of the section of all of the other figures.

Fig. VI is a view in diagrammatic sectional elevation of the exposed and washed material after a selected area has been peeled.

Fig. VII is a view in diagrammatic sectional elevation showing the material of Fig. VI after dyeing with a dye dissolved in water.

Fig. VIII is a view in diagrammatic sectional elevation showing the material of Fig. VI after it has been dyed in a dye dissolved in organic solvents.

Fig. IX is a view in diagrammatic sectional elevation showing the material of Fig. VIII after removal of the hardened bichromated image by means of a hypochlorite solution.

In order to use the material provided with the two coatings shown in Fig. 1, the strippable hydrophilic colloid coating is sensitized by treating it with an aqueous solution containing a dichromate salt (see Fig. II). A solution containing 3 parts of 99% isopropanol and 1 part of a 3% ammonium dichromate solution in water works very well. The excess sensitizing solution may be removed with a squeegee and the material should then be allowed to dry.

After drying, the sensitized hydrophilic colloid coating is exposed to a strong ultra violet light source (such as a carbon arc) through a line positive. This hardens all of the strippable coating except those narrow areas protected by the lines making up the line positive as shown in Fig. III. The exposed film is developed by soaking in warm water (about 85° F.) until the unexposed line portions are washed out. The material shown in Fig. IV is then again allowed to dry.

When dry, portions of the strippable hardened bichromated colloid coating lying between the removed lines may be stripped or peeled as shown in Fig. V. This is accomplished by lifting an edge of the coating with a tool 2 and then stripping the complete area by pulling on the loosened edge of the strippable coating.

Either a negative or a positive image which is opaque to actinic light may then be formed by dyeing the material shown in section in Fig. VI either with a solution of a dye in water or a solution of a dye in organic solvents. The solution of a dye in water will dye the remaining portions of the strippable hydrophilic colloid coating but not the adherent organic coating forming a dye relief image as shown in Fig. VII. This type of image is known as a negative image. If a solution containing a dye in organic solvents is used it will not affect the hydrophilic colloid coating but will dye the exposed portions of the adherent hydrophilic organic coating carried on the base film of polyethylene terephthalate as shown in Fig. VIII. The portions of the adherent organic coating protected by the strippable coating will not be dyed. The image formed in the adherent coating is known as a positive image. After a positive image is formed, the remaining portions of the strippable coating may be removed, for example, by soaking in a solution containing 5% of sodium hypochlorite giving a material as shown in Fig. IX. Either the negative or the positive image may be used for making copies by any suitable photographic contact printing process.

While the material described is very useful in the cartographic field, i.e., for making maps and the like, it will also find use in related fields. For example, one material can be used in the field of printed circuits. The printed circuit can be obtained by depositing a conducting material over the relief image formed in the strippable coating and then removing the remaining portions of the strippable coatings and the overlaying conducting coating so that a positive image of the conducting coating remains on the adherent coating carried by the base film of polyethylene terephthalate.

Having thus described the invention, what is claimed is:

1. A dimensionally stable flexible sheet material useful in cartography comprising a base film of orientated polyethylene terephthalate, an adherent coating on one side of said base film of a film forming hydrophobic organic material including a compound from the group consisting of nitrocellulose, ethyl cellulose, acrylic resins, urea formaldehyde resins, melamine formaldehyde resins and alkyd resins receptive to a first solution comprising dye dissolved in organic solvents but not to a second solution comprising dye dissolved in water and a coating comprising a hydrophilic compound from the group consisting of polyvinyl alcohol and gelatin applied over said adherent coating, which second coating is made photosensitive by treatment with an aqueous solution containing a bichromate and which after exposure is developed with water to form a relief image that is peelable in a continuous sheet from said adherent coating and is receptive to the solution comprising a dye dissolved in water but which will not accept a dye applied in a solution in organic solvents.

2. A dimensionally stable flexible sheet material useful in cartography comprising a base film of orientated polyethylene terephthalate, an adherent coating on one side of said base film of a film forming hydrophobic organic material including nitrocellulose receptive to a first solution comprising a dye dissolved in organic solvents but not to a second solution comprising a dye dissolved in water and a coating comprising a hydrophilic compound selected from the group consisting of polyvinyl alcohol and gelatin applied over said adherent coating, which second coating is made photosensitive by treatment with an aqueous solution containing a bichromate and which after exposure is developed with water to form a relief image that is peelable in a continuous sheet from said adherent coating and is receptive to the solution comprising a dye dissolved in water but which will not accept a dye applied in a solution in organic solvents.

3. A dimensionally stable flexible sheet material useful in cartography comprising a base film of orientated polyethylene terephthalate, an adherent coating on one side of said base film of a film forming organic material including nitrocellulose receptive to a first solution comprising a dye dissolved in organic solvents but not to a second solution comprising a dye dissolved in water and a coating comprising a hydrophilic polyvinyl alcohol applied over said adherent coating, which second coating is made photosensitive by treatment with an aqueous solution containing a bichromate and which after exposure is developed with water to form a relief image that is peelable in a continuous sheet from said adherent coating and is receptive to the solution comprising a dye dissolved in water but which will not accept a dye applied in a solution in organic solvents.

References Cited in the file of this patent

UNITED STATES PATENTS

| | | |
|---|---|---|
| 1,398,357 | Briggs et al. | Nov. 21, 1921 |
| 1,645,451 | Robe et al. | Oct. 11, 1927 |
| 2,119,189 | Widmer | May 31, 1938 |
| 2,322,333 | Widmer | June 22, 1943 |
| 2,408,578 | Penton | Dec. 18, 1946 |
| 2,494,053 | Mitson | Jan. 10, 1950 |
| 2,627,088 | Alles et al. | Feb. 3, 1953 |
| 2,698,239 | Alles et al. | Dec. 28, 1954 |
| 2,698,241 | Saner | Dec. 28, 1954 |
| 2,698,242 | Saner | Dec. 28, 1954 |

OTHER REFERENCES

Diserens: "The Chem. Tech. of Dyeing and Printing," Reinhold Pub. Co., N.Y., 1948, pages 137–139, vol. 1.

UNITED STATES PATENT OFFICE

CERTIFICATE OF CORRECTION

Patent No. 2,943,936

July 5, 1960

Daniel S. Spechler

It is hereby certified that error appears in the printed specification of the above numbered patent requiring correction and that the said Letters Patent should read as corrected below.

Column 3, line 44, before "hydrophilic" insert -- strippable --; line 60, for "one" read -- the --; line 62, for "depositiing" read -- depositing --.

Signed and sealed this 4th day of April 1961.

(SEAL)
Attest: ERNEST W. SWIDER
Attesting Officer

ARTHUR W. CROCKER
Acting Commissioner of Patents